(12) United States Patent
Oppenberg

(10) Patent No.: US 11,272,702 B1
(45) Date of Patent: Mar. 15, 2022

(54) INTEGRATED PEST CONTROL SYSTEM

(71) Applicant: Leonard Oppenberg, Morris Plains, NJ (US)

(72) Inventor: Leonard Oppenberg, Morris Plains, NJ (US)

(*) Notice: Subject to any disclaimer, the term of this patent is extended or adjusted under 35 U.S.C. 154(b) by 165 days.

(21) Appl. No.: 16/130,672

(22) Filed: Sep. 13, 2018

Related U.S. Application Data

(60) Provisional application No. 62/585,484, filed on Nov. 13, 2017.

(51) Int. Cl.
*A01M 25/00* (2006.01)
*F16M 13/06* (2006.01)
*F16M 13/02* (2006.01)

(52) U.S. Cl.
CPC .......... *A01M 25/004* (2013.01); *F16M 13/06* (2013.01); *F16M 13/02* (2013.01)

(58) Field of Classification Search
CPC .. A01M 25/004; A01M 25/00; A01M 25/002; A01M 1/10; A01M 1/103; F16M 13/06
USPC .......................................................... 43/131
See application file for complete search history.

(56) References Cited

U.S. PATENT DOCUMENTS

| | | | | |
|---|---|---|---|---|
| 794,323 | A * | 7/1905 | Small .................. | A01M 25/004 43/131 |
| 2,299,723 | A * | 10/1942 | Allbright ............ | A01M 25/004 43/131 |
| 2,519,567 | A | 8/1950 | Handschin | |
| 2,635,382 | A * | 4/1953 | Kuntz ................. | A01M 25/004 43/131 |
| 2,683,326 | A * | 7/1954 | Gardner ............. | A01M 25/004 43/131 |
| 2,714,780 | A * | 8/1955 | Glover ................ | A01M 25/004 43/131 |
| 2,763,093 | A * | 9/1956 | Scott .................. | A01M 25/004 43/131 |
| 2,896,362 | A * | 7/1959 | Wingate ............. | A01M 25/004 43/131 |
| 2,912,788 | A * | 11/1959 | Hargrove ............ | A01M 25/004 43/131 |
| 2,944,364 | A * | 7/1960 | Kelly .................. | A01M 25/004 43/131 |
| 2,964,871 | A * | 12/1960 | Hoffman ............ | A01M 25/004 43/131 |
| 3,015,184 | A * | 1/1962 | Scott .................. | A01M 25/004 43/131 |
| 3,025,630 | A * | 3/1962 | Silvey ................ | A01M 25/004 43/131 |

(Continued)

FOREIGN PATENT DOCUMENTS

| | | |
|---|---|---|
| GB | 2510414 | 8/2014 |
| GB | 2519567 | 4/2015 |
| WO | 2004098281 | 11/2004 |

*Primary Examiner* — Thanh Pham
(74) *Attorney, Agent, or Firm* — John Rizvi; John Rizvi, P.A.—The Patent Professor®

(57) ABSTRACT

An integrated pest control system is provided including a pest control device enclosure. The pest control device enclosure includes at least one movable access panel configured to provide controlled access to an interior of the pest control device enclosure. Further, the pest control device enclosure includes at least one pest access way configured to provide a pest access to the interior of the pest control device enclosure.

2 Claims, 12 Drawing Sheets

(56) References Cited

U.S. PATENT DOCUMENTS

| | | | | |
|---|---|---|---|---|
| 3,269,052 A * | 8/1966 | Barnhart | A01M 25/004 | 43/131 |
| 3,488,879 A * | 1/1970 | Laughlin | A01M 25/004 | 43/131 |
| 4,400,905 A | 8/1983 | Brown | | |
| 4,765,091 A * | 8/1988 | Sherman | A01M 25/004 | 43/131 |
| 4,835,902 A | 6/1989 | Sherman | | |
| 4,887,381 A * | 12/1989 | Tieben | A01M 23/18 | 43/66 |
| 4,895,267 A * | 1/1990 | Karlsson | B42F 17/02 | 220/4.28 |
| 4,945,673 A | 8/1990 | Lavelle | | |
| 5,136,803 A * | 8/1992 | Sykes | A01M 25/004 | 43/131 |
| 5,193,302 A * | 3/1993 | Rusco | A01M 1/02 | 43/107 |
| 5,588,249 A * | 12/1996 | Flinner | A01M 23/20 | 43/61 |
| 5,657,575 A * | 8/1997 | Miller | A01M 25/008 | 43/121 |
| 5,943,817 A * | 8/1999 | Miller | A01M 1/2011 | 43/131 |
| 5,966,863 A * | 10/1999 | Payton | A01M 1/2011 | 43/131 |
| 6,023,878 A * | 2/2000 | Fore | A01M 23/08 | 43/61 |
| 6,145,242 A * | 11/2000 | Simpson | A01M 1/2011 | 43/131 |
| 6,266,917 B1 * | 7/2001 | Hight | A01M 1/103 | 43/114 |
| 6,389,738 B1 * | 5/2002 | Denny | A01M 1/2011 | 43/58 |
| 6,513,283 B1 * | 2/2003 | Crossen | A01M 25/004 | 43/131 |
| 6,735,900 B2 * | 5/2004 | Wiesener | A01M 25/004 | 43/131 |
| 6,758,008 B1 * | 7/2004 | Thebolt | A01M 23/24 | 43/58 |
| 6,874,274 B2 | 4/2005 | Townsend | | |
| D582,504 S * | 12/2008 | Wiesener | D22/119 | |
| D660,394 S * | 5/2012 | Baker | D22/119 | |
| D667,526 S * | 9/2012 | Covington | D22/119 | |
| 8,701,337 B2 * | 4/2014 | Kay | A01M 25/004 | 43/131 |
| 8,701,594 B2 * | 4/2014 | Vickery | A01M 25/004 | 119/51.01 |
| D802,080 S * | 11/2017 | Lo | D22/119 | |
| 2006/0156615 A1 * | 7/2006 | Hale | A01M 23/30 | 43/58 |
| 2006/0156617 A1 * | 7/2006 | Hale | A01M 23/30 | 43/81 |
| 2015/0342171 A1 * | 12/2015 | Seyss | A01M 23/08 | 43/58 |
| 2015/0351378 A1 * | 12/2015 | Zero | A01M 23/22 | 43/62 |
| 2020/0178514 A1 * | 6/2020 | Schurman | A01M 23/30 | |

* cited by examiner

INTEGRATED PEST CONTROL SYSTEM

CROSS-REFERENCE TO RELATED APPLICATIONS

This application claims the benefit of U.S. Provisional Patent Application Ser. No. 62/585,484, filed on Nov. 13, 2017, which is incorporated by reference herein in its entirety.

FIELD OF THE INVENTION

The present invention relates generally to pest control systems, and more particularly, to an integrated pest control system incorporated in adjoining structures, fixtures, decorative elements, and/or architectural elements and configured to conceal a pest control device. The pest control device can be any commercially available device, and the integrated pest control system allows arranging the pest control device to be non-obvious to plain sight.

BACKGROUND OF THE INVENTION

In residential and commercial buildings, pests can make habitation unpleasant and potentially unsanitary or unhealthy for humans. In urban areas, the availability of garbage and other wastes provide ready nourishment for pests, allowing them to thrive. In rural areas, food for pests is often readily available allowing them to thrive in those environments as well. These conditions necessitate some form of pest control.

Due to the discomfort and health problems presented by the presence of pests, building, landowners and occupants desire to eliminate pests. Pest control on many premises is provided by bait stations. A bait station is a pest control device designed to allow pests access to rodenticide or other form of bait or a physical trap that is within the bait station. The pests enter the bait station, consume the rodenticide or other form of bait, and then return to their nest and die, or can be trapped by the physical trap. The bait stations provide a means for pest control and reduces the pest population.

Most pest control devices are visible at a distance. Because of the negative connotation associated with pest control devices, most people find the visibility of such pest control devices objectionable. Because most pest control devices are highly visible, their presence is detrimental to businesses, particularly in the food and hospitality industries.

Since most pest control devices are easily recognizable when viewed by a guest, most pest control devices present a generally unappealing appearance to the viewer.

Although the pest control device may be placed behind other objects or covered to hide them, this is undesirable because it hinders accessibility to the device. Further, in some institutional settings, monitoring and control of the pest control device requires maintaining an unburdened access path to the pest control device for maintenance personnel.

Pests like to feed where they are most at ease, and pest control devices are designed with this in mind. For many pests, the preferred areas are a bit darker and where there is clutter. Since most pests don't see well, most pests move around along edges of buildings or structures. These pests feel their way along walls and natural edges. Therefore, effective pest control device placement requires placing pest control devices around perimeters of buildings. However, the placement of pest control devices presents an aesthetical issue.

Accordingly, there is an established need for a cost-effective integrated pest control system which solves at least one of the aforementioned problems. Further, there is an established need for integrated pest control systems which can utilize commercially available pest control devices, without requiring specialized pest control device manufacturing, which thereby reduces capital and operating costs from systems known in the art, and which are configured to be non-obvious to plain sight.

SUMMARY OF THE INVENTION

The present invention is directed to cost effective systems of integrated pest control wherein commercially available pest control devices are utilized within integrated pest control systems deploying effective pest control in domestic, commercial, and institutional settings. These integrated pest control systems provide for controlled access to the pest control devices wherein the pest control devices are configured within the systems to be non-obvious to plain sight. These systems require less capital and operating costs than systems requiring specially manufactured pest control devices. Further, these systems are scalable and can be utilized in residential, commercial and/or institutional environments, of all sizes. Additionally, these systems are configured to hide the pest control devices and render the pest control devices non-visible to plain sight.

In a first implementation of the invention, an integrated pest control system comprises a pest control device enclosure having an interior for receiving a pest control device. The pest control device enclosure includes at least one movable access panel configured to provide controlled access to an interior of the pest control device enclosure. The pest control device enclosure further includes at least one through opening extending through the pest control device enclosure and configured to provide a pest access to the interior of the pest control device enclosure from outside the pest control device enclosure.

In a second aspect, one or more openings of the at least one through opening can be located in the at least one movable access panel.

In another aspect, the at least one through opening can include a first through opening and a second through opening located on opposite first and second side panels of the pest control device enclosure.

In another aspect, the at least one movable access panel can include at least one of the first side panel and the second side panel. In other words, one or both of the first and second side panels can be movable to allow or prevent access to the interior of the pest control device enclosure.

In another aspect, the first and second side panels can be located at a left and a right side of the pest control device enclosure, respectively, and the pest control device enclosure can further include a back panel located on a back side of the pest control device enclosure. In some embodiments, the back panel can be flat, and configured to rest flatly against a wall or vertical surface. Alternatively or additionally, the back panel can include at least one through opening configured to receive a fastener for securing the back panel to a wall or vertical surface. Alternatively or additionally, the first through opening and the second through opening can be closer to the back panel than to a front panel located on a front side of the pest control device enclosure opposite to the back panel. Alternatively or additionally, the first through opening and the second through opening can be aligned with one another along a left-to-right, transverse direction of the pest control device enclosure.

In another aspect, the integrated pest control system can further include a pest control device arranged within the interior of the pest control device enclosure. In some embodiments, the pest control device comprises at least one of a bait station, a bait trap and a physical trap. For example, the integrated pest control system can be configured for various species of pests, including but not limited to rats, mice, spiders, ants, cockroaches, snakes, flying insects, and other pests.

In another aspect, the pest control device can be insertable into the interior of the pest control device enclosure through an access created by moving the at least one movable access panel to an open position.

In another aspect, the pest control device can be retained within the interior of the pest control device enclosure by moving the at least one movable access panel to a closed position.

In another aspect, the pest control device can include at least one pest access opening horizontally aligned with the at least one through opening of the pest control device enclosure.

In another aspect, the integrated pest control system can further include a lock mechanism for securing the at least one movable access panel in a closed position in which the at least one movable access panel is configured to prevent removal of a pest control device from the interior of the pest control device enclosure.

In another aspect, the integrated pest control system can further include at least one protrusion protruding upward from a top panel of the pest control device enclosure. The at least one protrusion can be configured to prevent a sideways movement of an object along the top panel when rested on the top panel.

In another aspect, the integrated pest control system can further include a decorative element placed on a top panel of the pest control device enclosure.

In another aspect, a top panel of the pest control device enclosure can be horizontal and configured for the standing of one or more objects thereon.

These and other objects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, where like designations denote like elements, and in which.

Like reference numerals refer to like parts throughout the several views of the drawings.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIGS. 1-9. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Shown throughout the figures, the present invention is directed to a cost-effective system of integrated pest control wherein a commercially available pest control device is utilized within the integrated pest control system deploying effective pest control in domestic, commercial and institutional settings. The integrated pest control system provides for controlled access to the pest control device while the pest control device is configured within the system to be non-obvious to plain sight.

Figure 1:
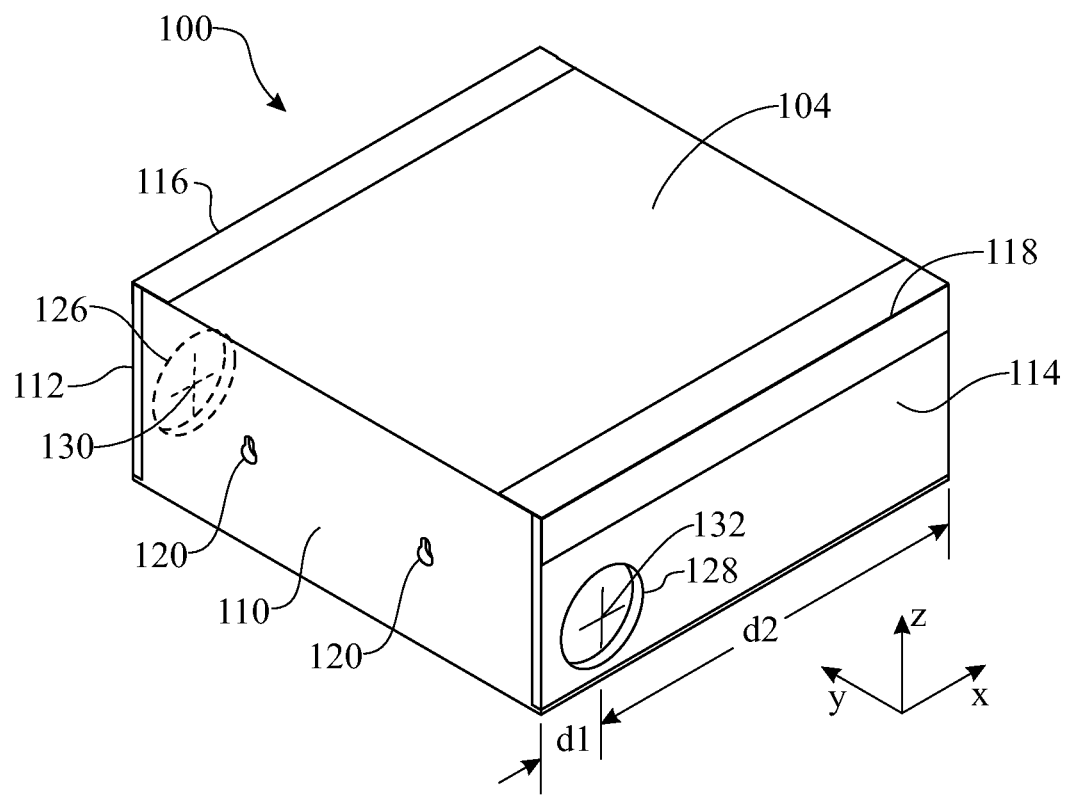
FIG. 1 presents a top back isometric view showing a pest control device enclosure in accordance with an illustrative embodiment of the present invention.
Figure 2:
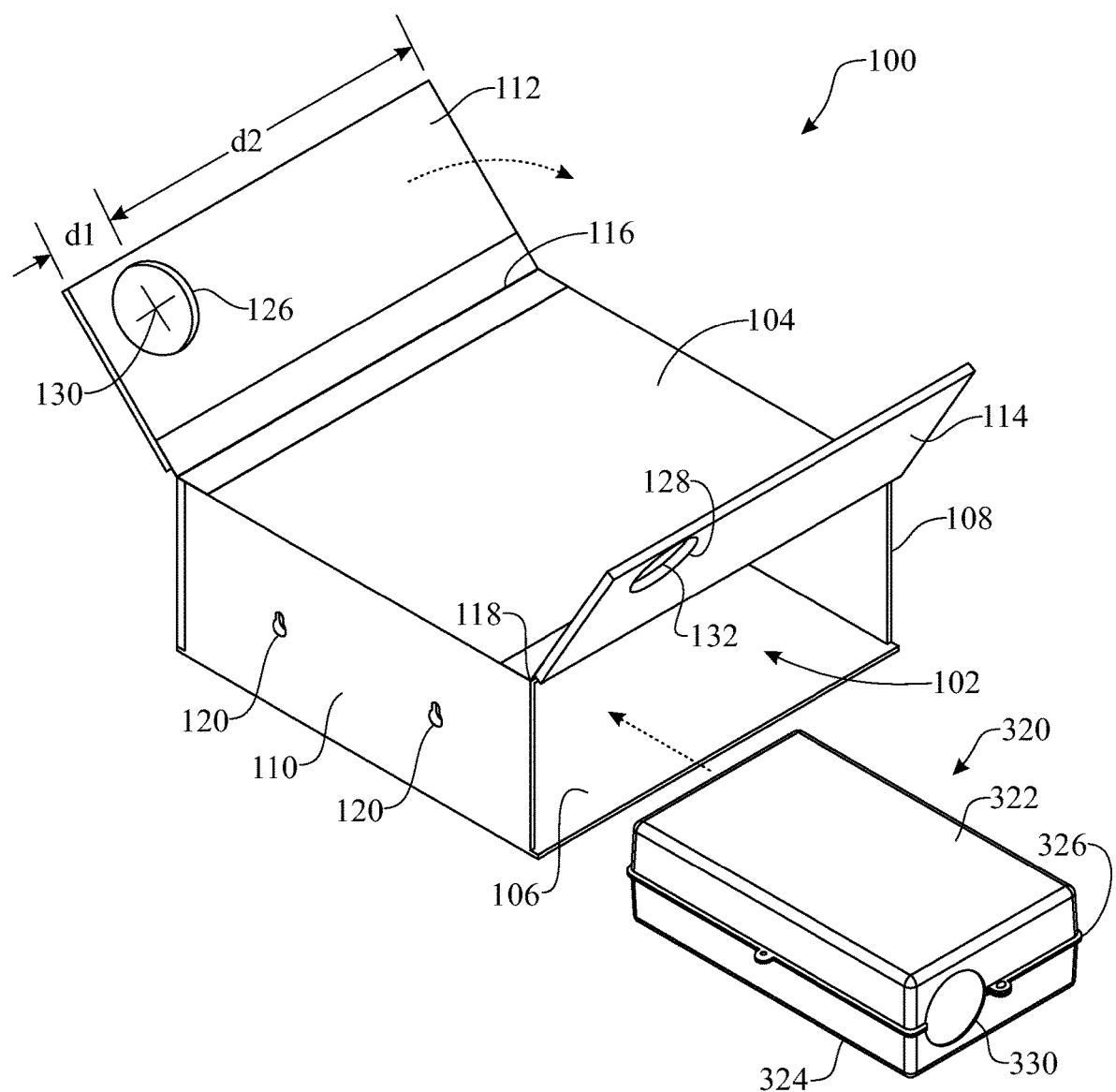
FIG. 2 presents an exploded isometric view showing the pest control device enclosure and a pest control device.

Referring initially to FIGS. 1 and 2, a pest control device enclosure 100 for an integrated pest control system is illustrated in accordance with an exemplary embodiment of the present invention. As shown, the pest control device enclosure 100 comprises an interior 102 and further includes a top panel 104, a bottom panel 106, a front panel 108, a back panel 110, a first side panel or first access panel 112 and an opposite, second side panel or second access panel 114 which delimit the interior 102 of the pest control device enclosure 100. The top and bottom panels 104 and 106 are spaced apart from one another along a vertical axis z of the pest control device enclosure 100 and affixed to the back panel 110 and to the front panel 108. The first access panel 112 is opposite to the second access panel 114 and is spaced apart with the second access panel 114 along a transverse axis y of the pest control device enclosure 100 which is perpendicular to the vertical axis z. The back panel 110 is opposite to the front panel 108 and is spaced apart with the front panel 108 along a longitudinal axis x of the pest control device enclosure 100 which is perpendicular to the transverse axis y and vertical axis z. As best shown in FIG. 2, the back panel 110 comprises one or more fastener holes 120 spaced apart from one another and extending through the back panel 110. The fastener holes 120 can be configured for receiving various types of fasteners 122 (FIG. 3) including, but not limited to, screws, bolts, hooks, pins, and/or rods for purposes that will be hereinafter described.

With continued reference to FIG. 2, the top panel 104 is affixed to the first access panel 112 with a first hinged connection 116 and to the second access panel 114 with a second hinged connection 118. The first hinged connection 116 allows for rotation of the first access panel 112 relative to the top panel 104. The second hinged connection 118 allows for rotation of the second access panel 114 relative to the top panel 104. Rotation of the first access panel 112 and the second access panel 114 provides for opening and closing of the pest control device enclosure 100. Furthermore, as illustrated, the first access panel 112 comprises a first through opening 126 and the second access panel 114 comprises a second through opening 128, wherein the first and second through openings 126 and 128 are shaped and sized to allow a rodent, snake, insect or other pest to pass through. In some embodiments, such as in the present embodiment, the first and second through openings 126 and 128 are positioned in transverse alignment, i.e. with their centers 130 and 132 in registration with one another along the transverse axis y of the pest control device enclosure 100 when the first and second access panels 112 and 114 are arranged in the closed position of FIG. 1. Alternatively or additionally, the first and second through openings 126 and 128 can be arranged closer, a distance D1, to the back panel 110 than to the front panel 108, which is a distance D2 from the opening, as shown in FIG. 1. Furthermore, in some embodiments, the first and second through openings 126 and 128 can be identically shaped and sized.

Figure 6:
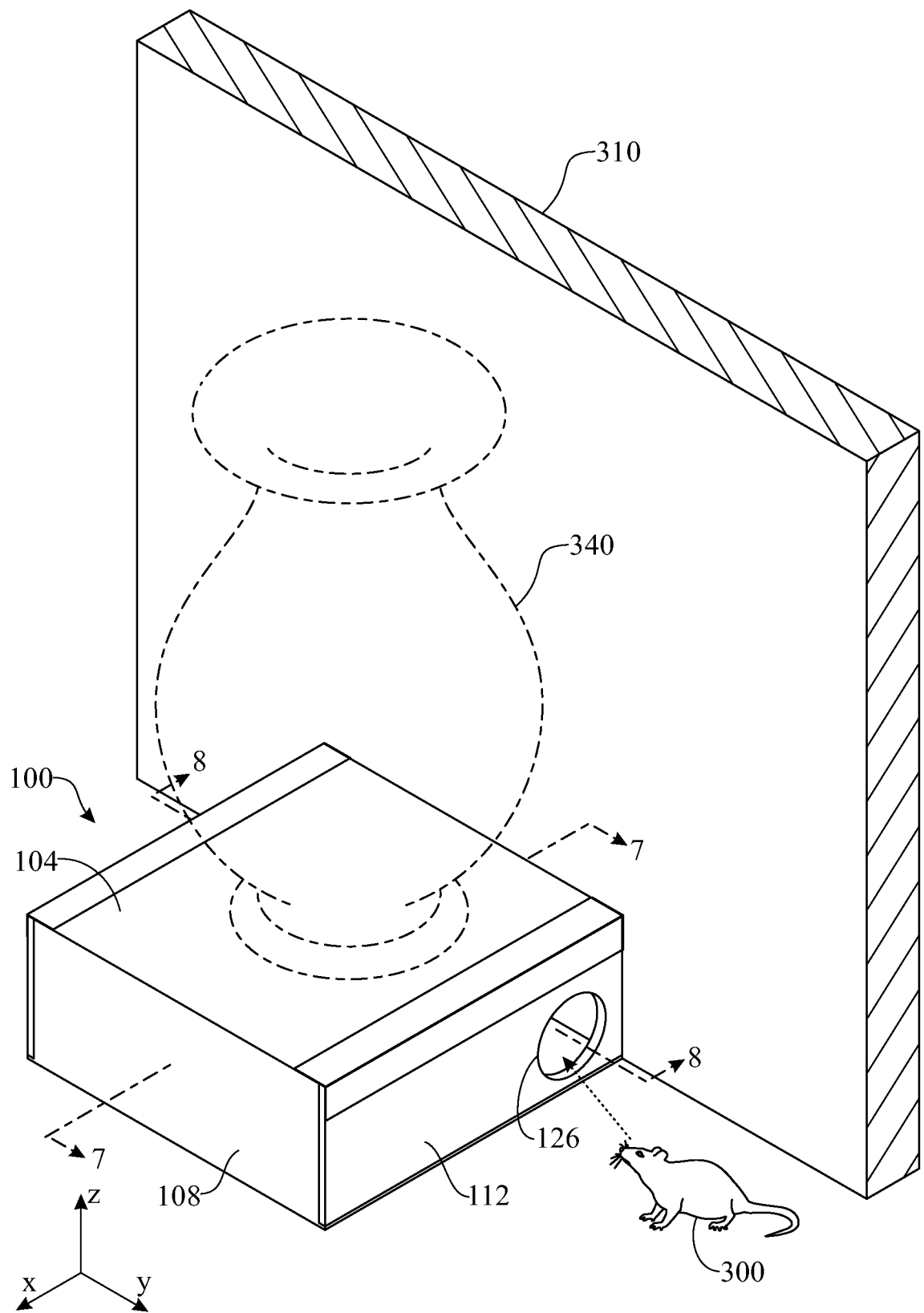
FIG. 6 presents a top front isometric view showing the pest control device enclosure adjacent to the structure, wherein the pest control device enclosure is integrated with a decorative element.

As shown in FIG. 6, the vertical and/or longitudinal positioning of the first through opening 126 can be configured with consideration of the species of pests 300 intended to be controlled. For example, some species of pests 300 possess poor vision and subsequently these pests 300 utilize contours of structures 310 such as walls or the like as guides to their movement. In consideration of the targeted species of pest 300, the first and second through openings 126 and/or 128 are preferentially placed along a length (dimension along longitudinal axis x) of the first access panel 112 and/or the second access panel 114 to optimize pests 300 entering the pest control device enclosure 100. For example, as mentioned heretofore, placement of the first and/or second through opening 126, 128 closer to the contours of the structure 310 (i.e. closer to the back panel 110 than to the front panel 108) increases the probability of the pests 300 with poor vision entering the pest control device enclosure 100.

The illustration of FIG. 2 further shows a pest control device 320 in the process of being placed in the interior 102 of the pest control device enclosure 100. The pest control device 320 can be commercially known, for instance and without limitation, and can include an enclosure optionally formed by a top half 322 and a bottom half 324 wherein the two halves are joined together at a seam 326 of the pest control device 320. The pest control device 320 can include two transversely-opposite pest access openings 328 (shown in FIGS. 7 and 8) and 330 providing access to an interior 332 of the pest control device 320 which houses a rodenticide or other form of bait or physical trap or the like (not illustrated).

Figure 7:
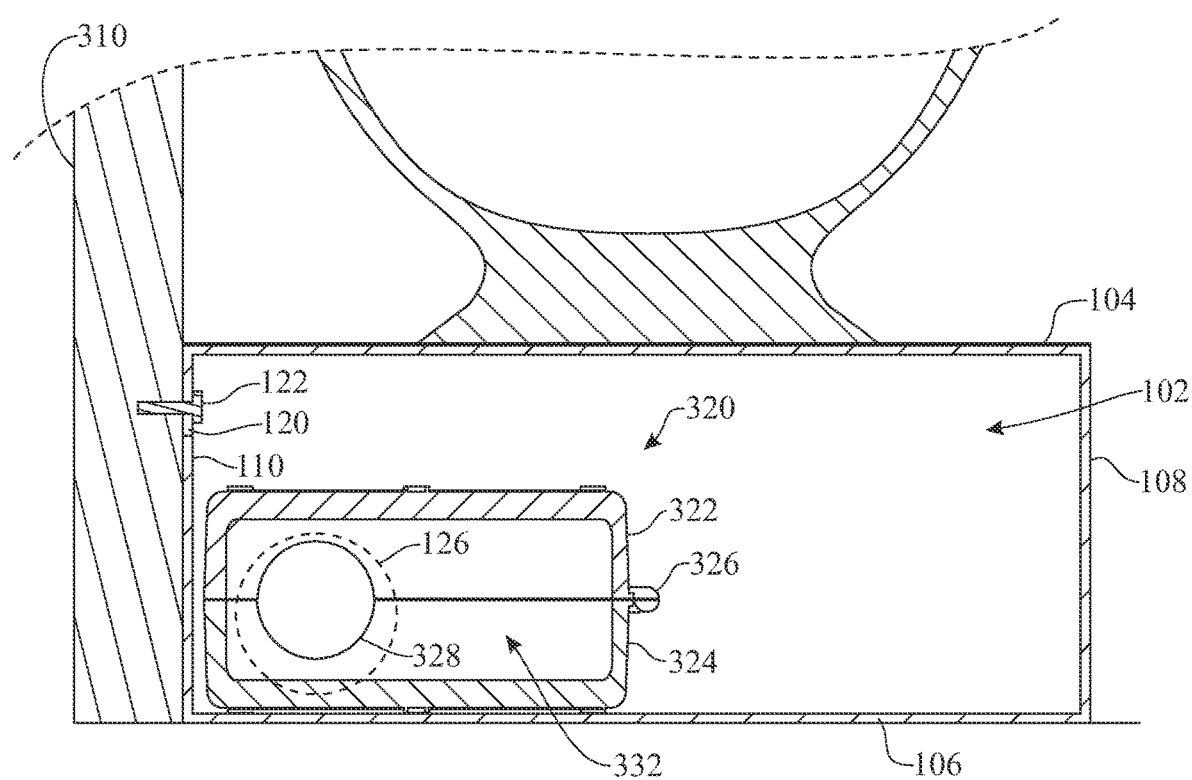
FIG. 7 presents a cross-sectional side elevation view showing the pest control device contained within the pest control device enclosure, the cross section taken along section plane 7-7 indicated in FIG. 6, wherein the enclosure is affixed to the structure and integrated with the decorative element.
Figure 8:
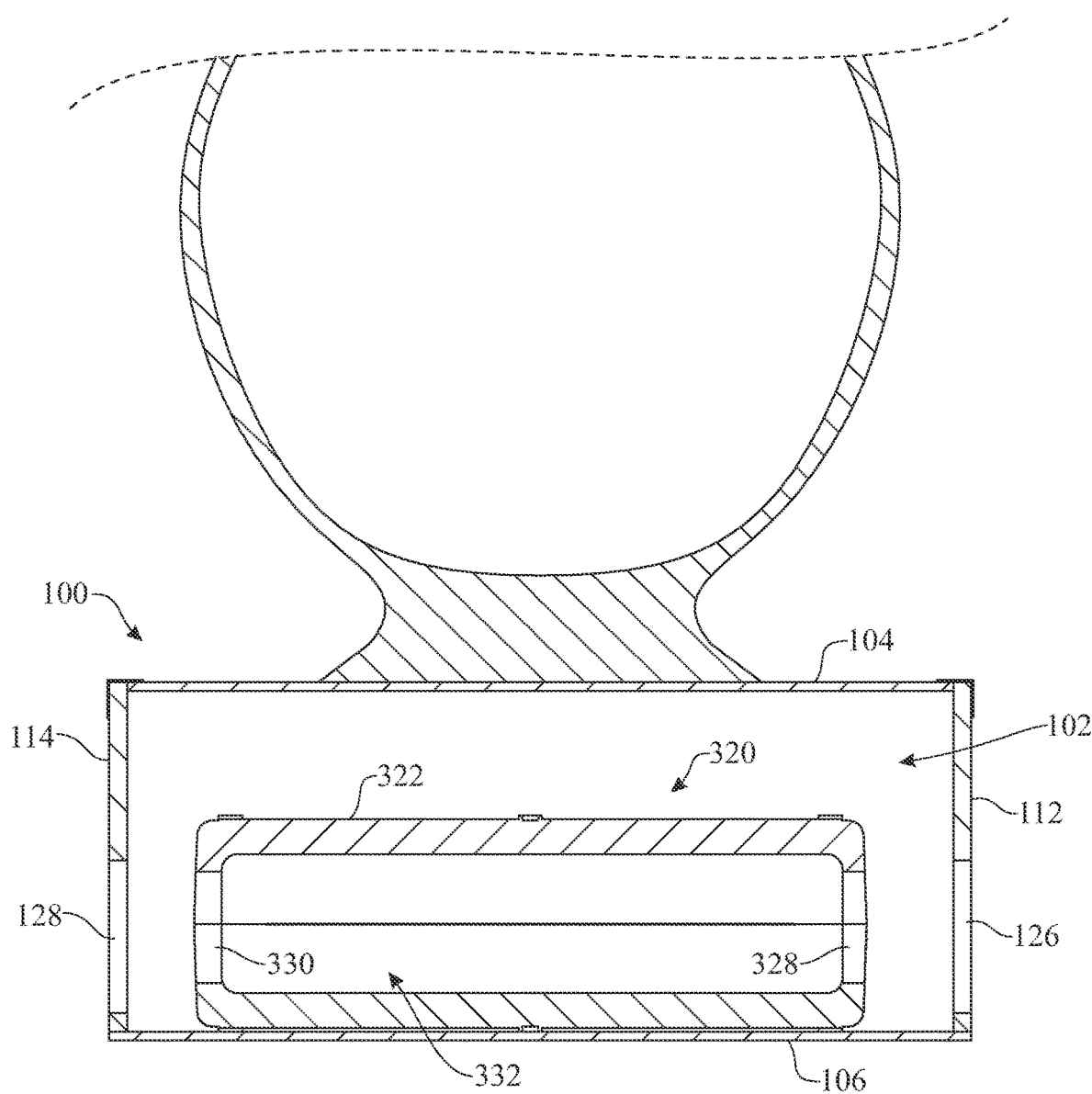
FIG. 8 presents a cross-sectional front elevation view showing the pest control device contained within the pest control device enclosure, the cross section taken along section plane 8-8 indicated in FIG. 6, wherein the enclosure is integrated with the decorative element.

As presently shown in FIGS. 2 and 7, the interior 102 of the enclosure 100 can be configured to provide placement of virtually any commercially available pest control device 320 within the enclosure. As best shown in the cross-sectional views of FIGS. 7 and 8, the pest control device 320 can be placed on a top of and supported by the bottom panel 106 of the pest control device enclosure 100 and can be aligned with the front panel 108, the back panel 110, the first access panel 112, and/or the second access panel 114. Additionally, the pest control device 320 can be preferentially placed in the interior 102 of the pest control device enclosure 100 such the first through opening 126 of the pest control device enclosure 100 is aligned with the pest access opening 328 of the pest control device 320 and the second through opening 128 of the pest control device enclosure 100 is aligned with the pest access opening 330 of the pest control device 320, to further facilitate a pest 300 accessing the interior 332 of the pest control device 320 which is in turn housed inside the pest control device enclosure 100.

Figure 3:
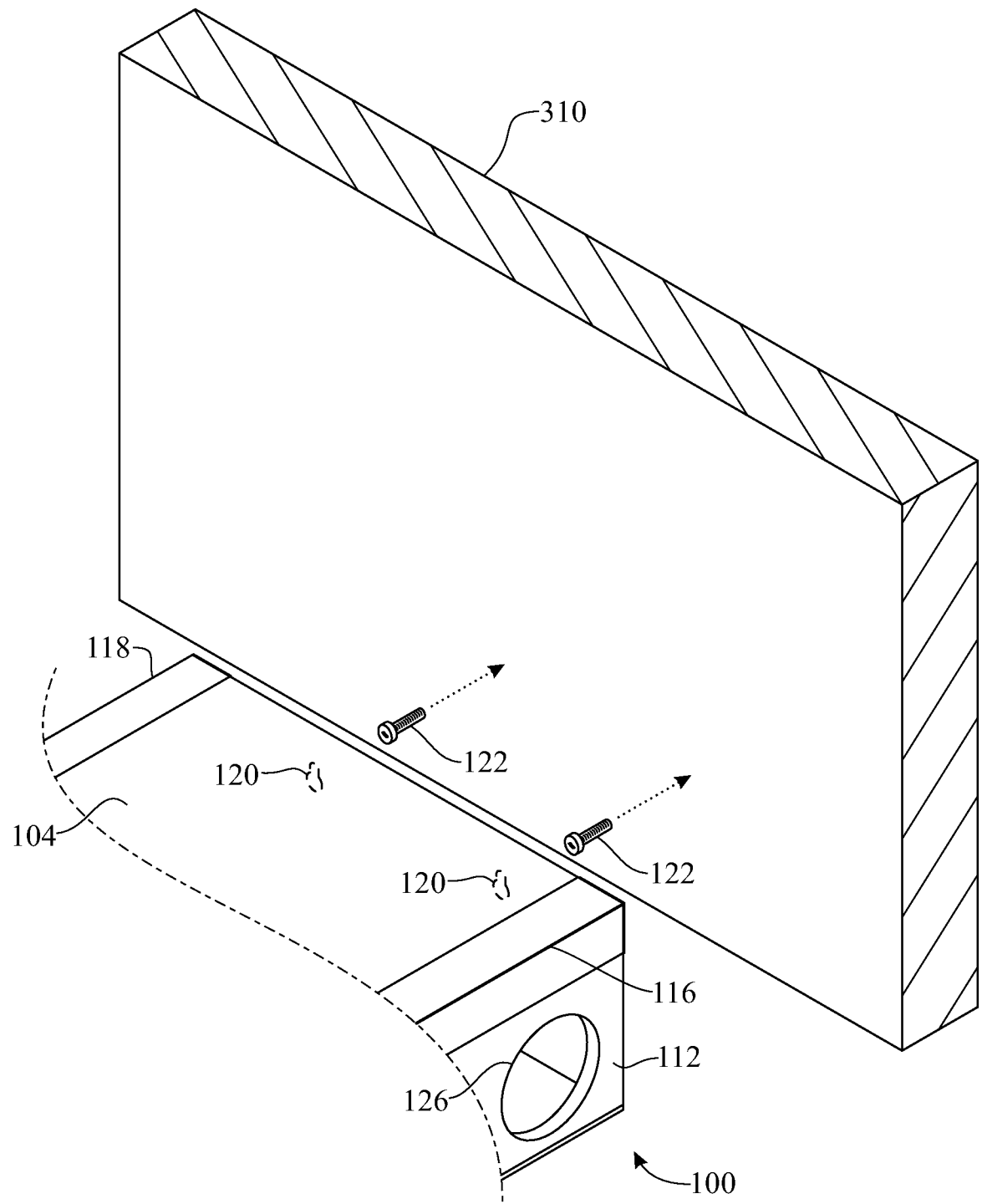
FIG. 3 presents a top isometric view showing a first step of attaching the pest control device enclosure to a structure.
Figure 4:
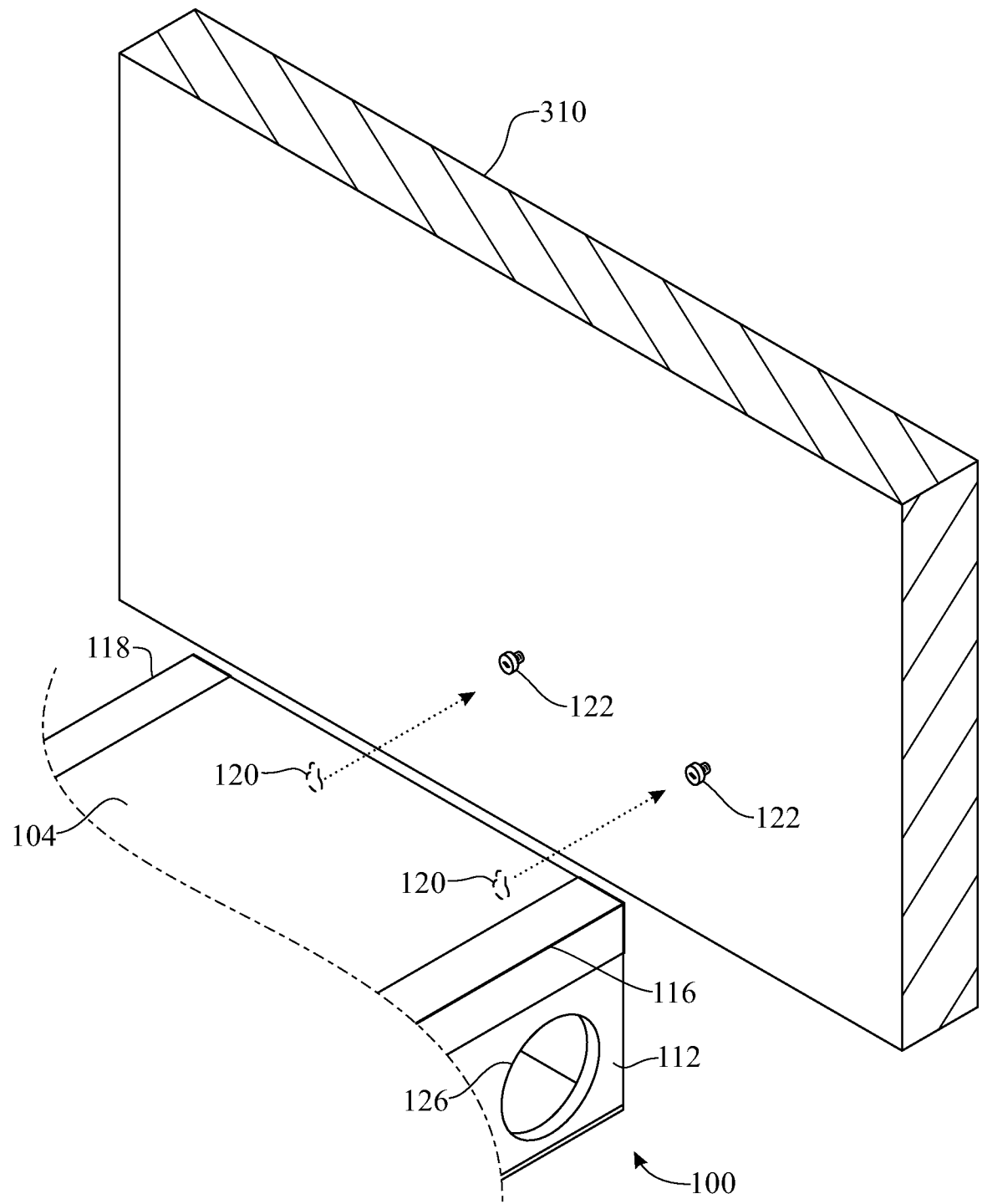
FIG. 4 presents a top isometric view showing a second step of attaching the pest control device enclosure to the structure.
Figure 5:
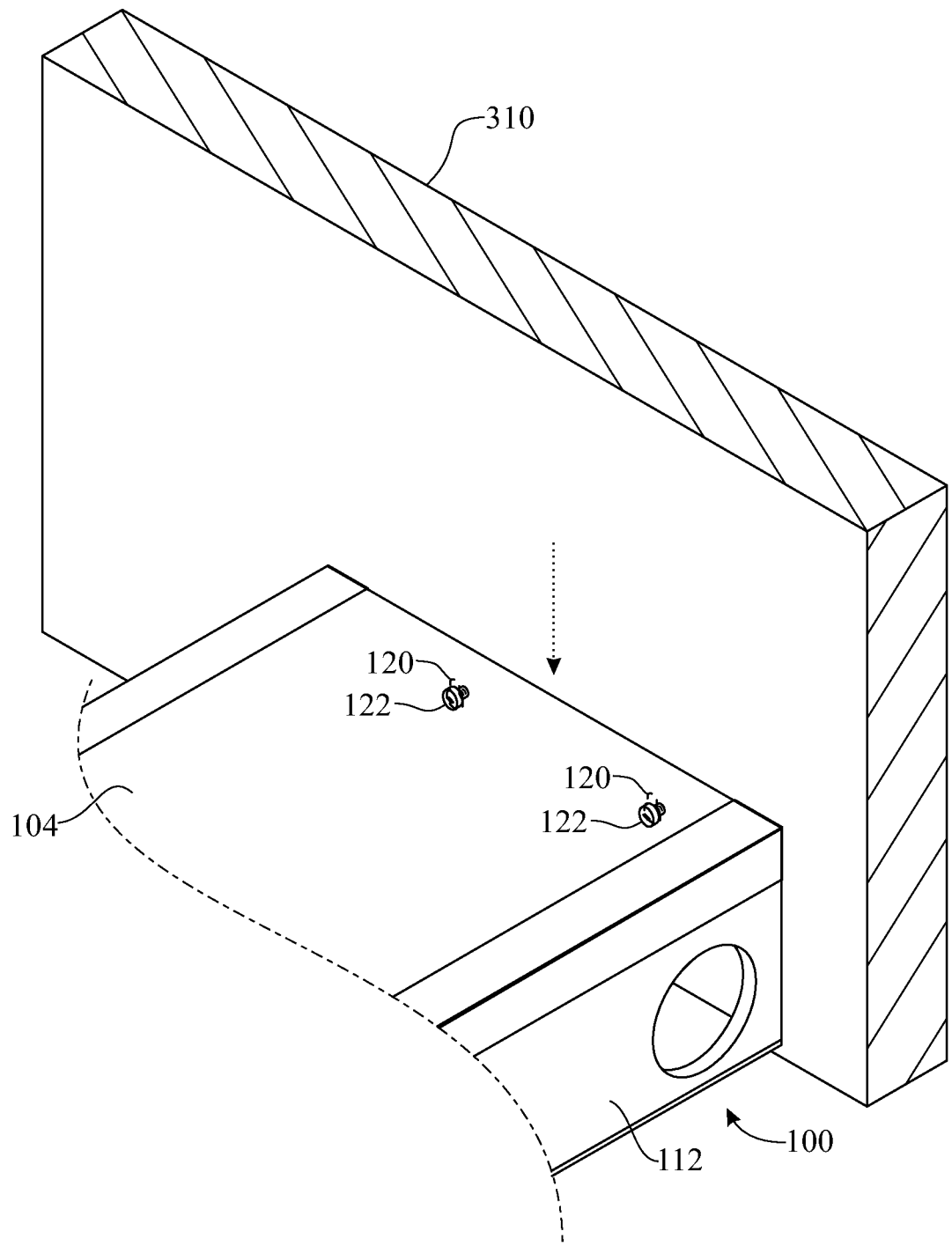
FIG. 5 presents a top isometric view showing a third step of attaching the pest control device enclosure to the structure.

The illustrations of FIGS. 3-5 further depict the attachment of the pest control device enclosure 100 to the structure 310. As best shown in FIG. 3, the fasteners 122 are shown aligned to be attached to the structure 310, and the fastener holes 120 of the pest control device enclosure 100 are aligned with the fasteners 122 to fasten the pest control device enclosure 100 to the structure 310. In some embodiments, such as presently shown, the fasteners 122 are screws, which are screwed into the structure 310, and the fastener holes 120 are large enough to fully receive a screw head of the screws and "hook" the back panel 110 onto the screws, as shown in FIG. 5, to secure the pest control device enclosure 100 to the structure 310 substantially preventing undesired movement of the pest control device enclosure 100 in any of the illustrated directions x, y, z unless a user voluntarily exerts a relatively large, upward force on the pest control device enclosure 100 in order to "unhook" the pest control device enclosure 100 from the screws for removing the pest control device enclosure 100.

Turning to FIG. 6, an illustrative application of the invention is shown in which a decorative element 340 is placed on top of the pest control device enclosure 100. The decorative element 340 may be an architectural, structural and/or ornamental element. In some embodiments, such as presently shown, the decorative element can be a flower pot on top of the pest control device enclosure 100. As shown, by having the first and second through openings 126 and 128 arranged on a rear area of the first and second access panels 112 and 114, respectively, and thus closer to the wall or structure 310 (i.e. to the back panel 110) than to the front of the pest control device enclosure 100 (i.e. to the front panel 108), the decorative element 340 can be placed frontward of the first and second through openings 126 and 128 contributing to discreetly hide the presence of a pest control device from plain sight. In some embodiments, as shown, the top panel 104 of the pest control device enclosure 100 may be flat to facilitate sitting the decorative element 340 on top of the top panel 104.

Figure 9:
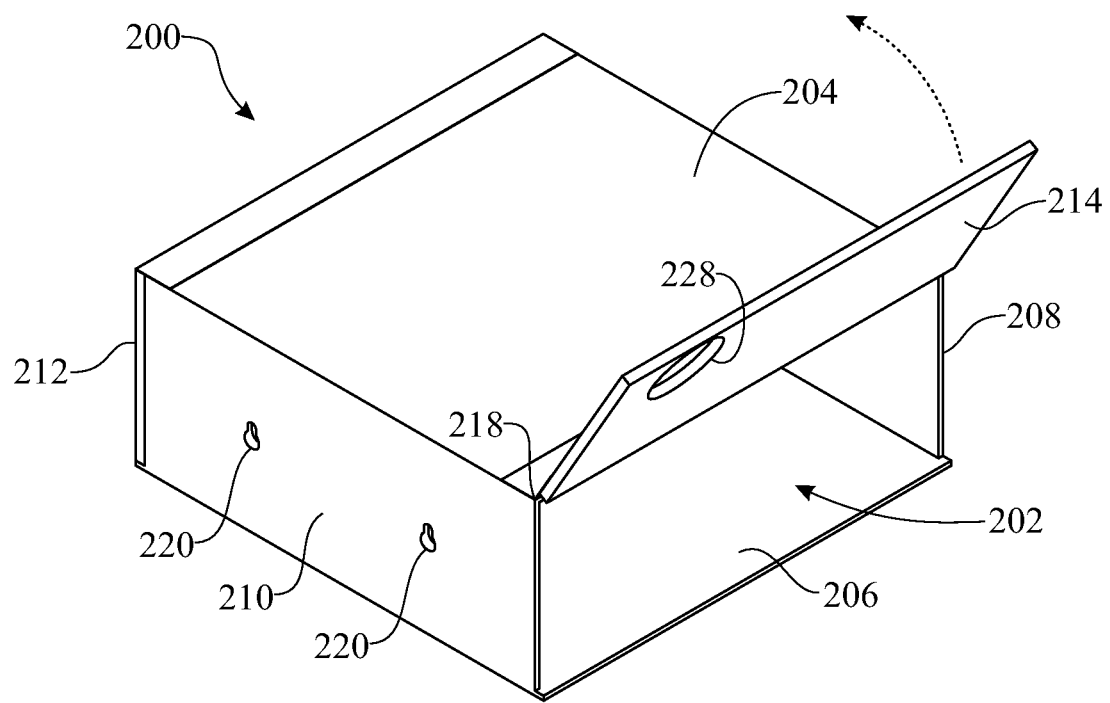
FIG. 9 presents a top back isometric view showing the pest control device enclosure in accordance with a second illustrative embodiment of the invention.

The illustration of FIG. 9 presents a pest control device enclosure 200 in accordance with a second exemplary embodiment of the present invention. Like features of the pest control device enclosure 200 and the pest control device enclosure 100 of the previous figures are numbered the same except preceded by the numeral '2'. As shown, the pest control device enclosure 200 comprises a top panel 204, a bottom panel 206, a front panel 208, a back panel 210, a first access panel 212 and an opposite, second access panel 214. The bottom panel 206 is affixed to the back panel 210 of the pest control device enclosure 200. The bottom panel 206 is affixed to front panel 208. The top panel 204 is opposite to the bottom panel 206 and is spaced apart with the bottom panel 206. The first access panel 212 is opposite to the second access panel 214 and is spaced apart with the second access panel 214.

As illustrated in FIG. 9, the second access panel 214 comprises a through opening 228 configured to allow a pest to pass through. While not specifically shown, the first access panel 212 can include a similar through opening, as in the previous embodiment, which is also preferably aligned with the through opening 228 of the second access panel 214. Further, the back panel 210 comprises one or more fastener holes 220 spaced apart from one another. The fastener holes 220 can be configured for various types of fasteners including, but not limited to, screws, bolts, hooks, pins, and/or rods.

Similarly to the previous embodiment, the second access panel 214 is affixed to the top panel 204 in a hinged manner with the hinged connection 218, allowing for rotation of the second access panel 214 providing for opening and closing of the pest control device enclosure 200. However, unlike the previous embodiment, the first access panel 212 is fixed, and attached to the top panel 204 and remaining adjacent panels by a fixed connection. Access to an interior 202 of the pest control device enclosure 200 for inserting or removing a pest control device (such as the pest control device 320 shown in FIG. 2) is provided by opening the second access panel 214.

Figure 10:
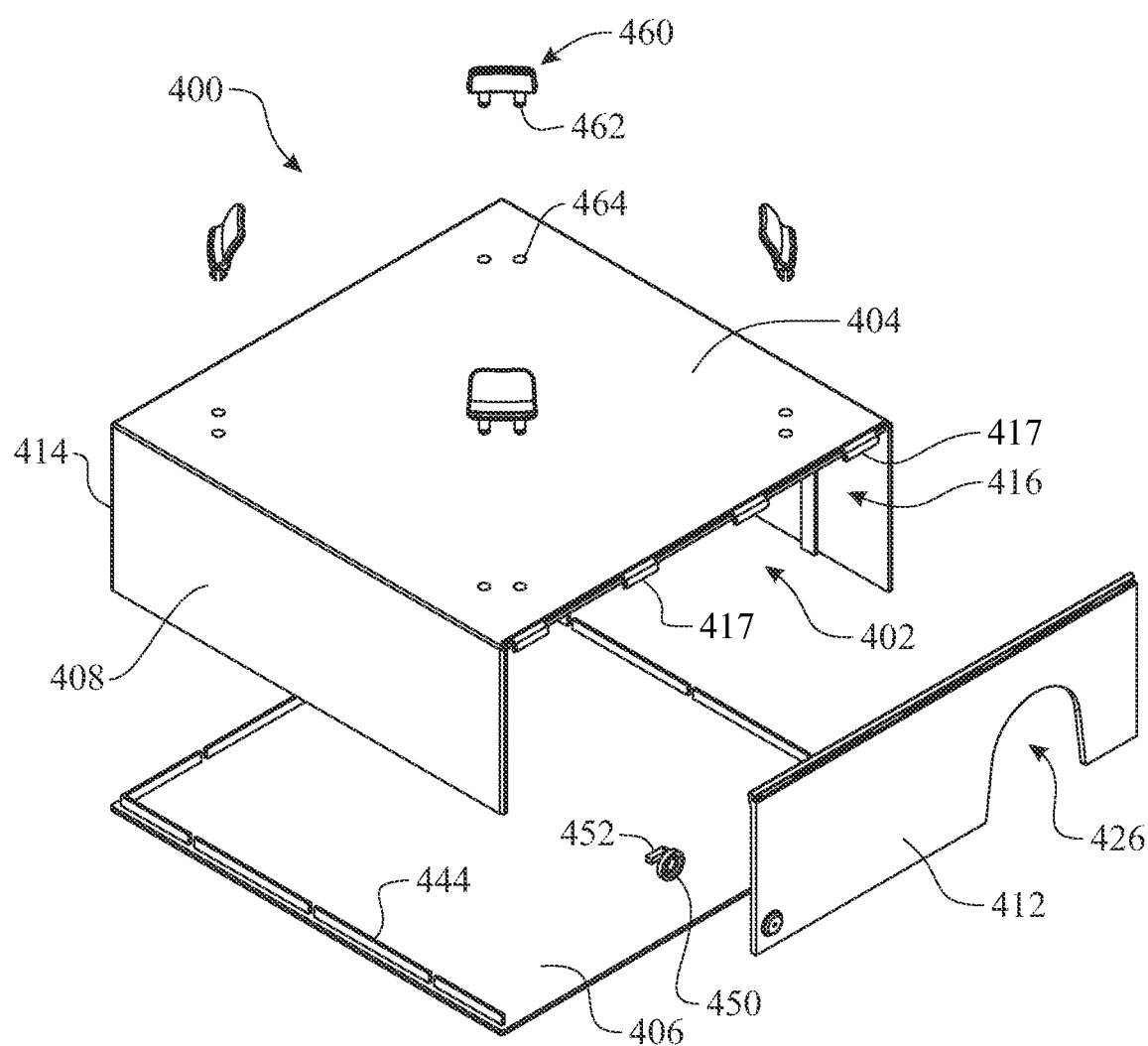
FIG. 10 presents a partially exploded, top front isometric view showing a pest control device enclosure in accordance with a third illustrative embodiment of the present invention.
Figure 11:
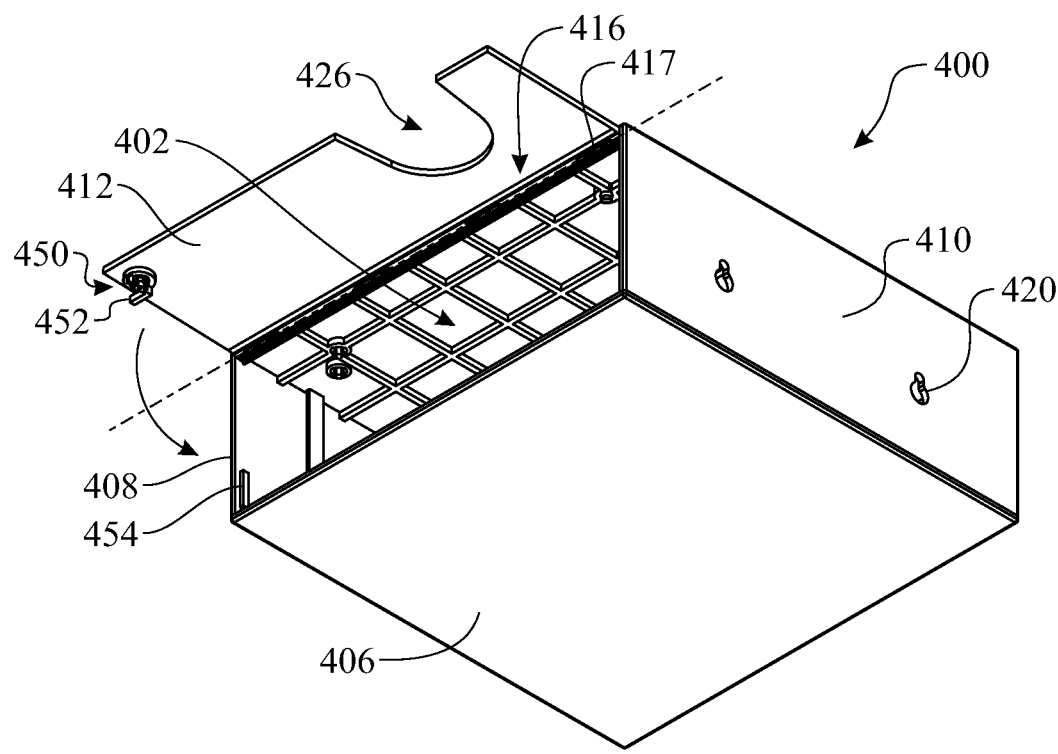
FIG. 11 presents a bottom, side isometric view of the pest control device enclosure of FIG. 10, with the first access panel shown in an open position revealing a lock mechanism.
Figure 12:
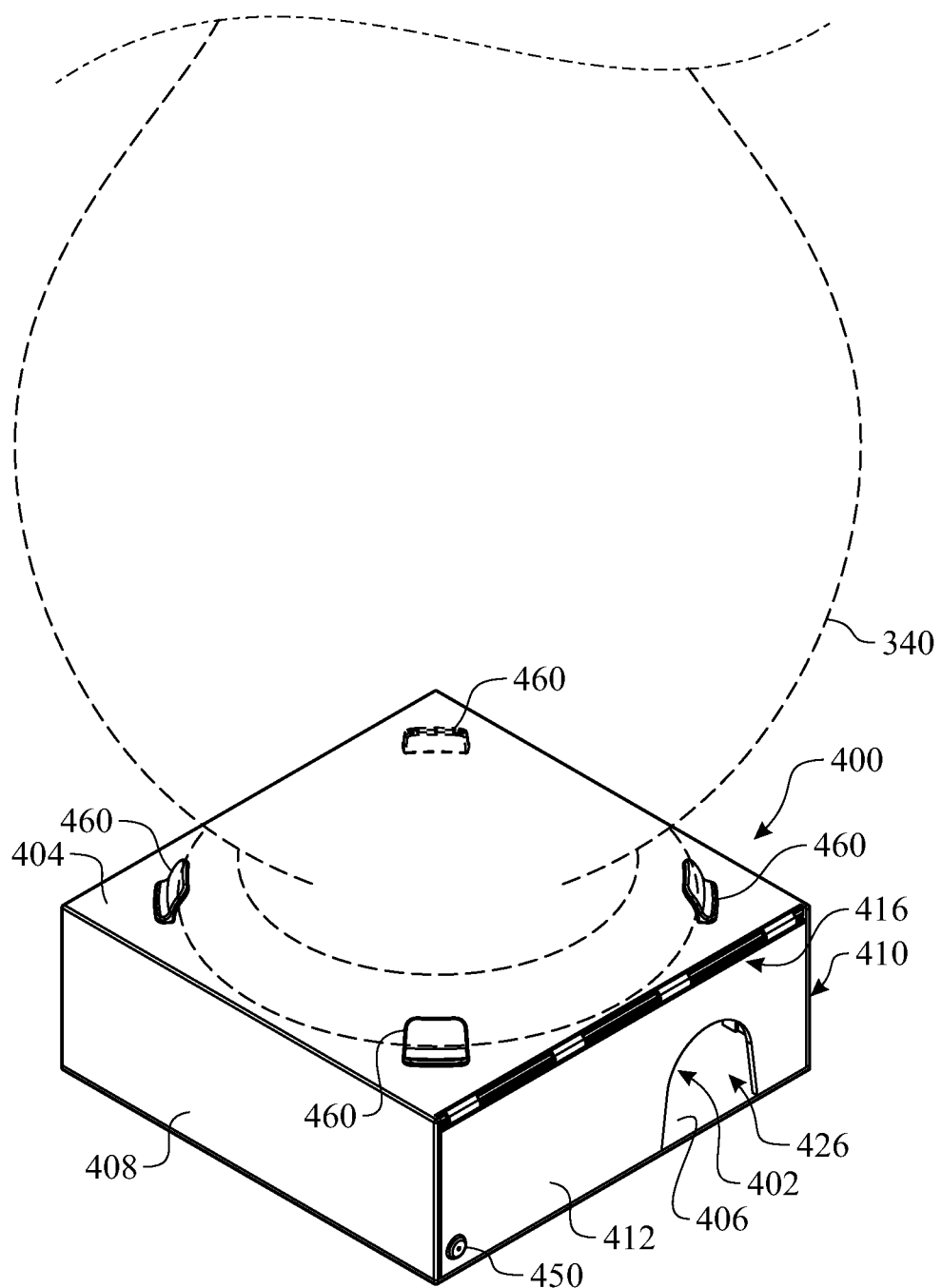
FIG. 12 presents a top front isometric view of the pest control device enclosure of FIG. 10, in a fully assembled and closed position, with four top protrusions retaining a decorative element such as, but not limited to, a pot or vase in place on the top panel.

The illustrations of FIGS. 10-12 present a pest control device enclosure 400 in accordance with a third illustrative embodiment of the present invention. Like features of the pest control device enclosure 400 and the pest control device enclosure 100 of the first embodiment are numbered the same except preceded by the numeral '4'. As shown, similarly to the previous embodiments, the pest control device enclosure 400 comprises an interior 402 delimited by a top panel 404, a bottom panel 406, a front panel 408, a back panel 410, a first access panel 412 and an opposite, second access panel 414. The top and bottom panels 404 and 406 are affixed to the front and back panels 408 and 410. The top panel 404 is opposite to the bottom panel 406 and is spaced apart with the bottom panel 406. The first access panel 412 is opposite to and spaced apart from the second access panel 414. Unlike previous embodiments, the bottom panel 406 is disconnectably attached to the front, back and second access panels 408, 410 and 414 by a snap fastener 444.

As illustrated in FIG. 10, the first access panel 412 comprises a through opening 426 configured to allow a pest to pass through. While not specifically shown, the second access panel 414 can include a similar through opening, as in the previous embodiments, which is also preferably aligned with the through opening 426 of the first access panel 412. Further, the back panel 410 comprises one or more fastener holes 420 spaced apart from one another. The fastener holes 420 can be configured for various types of fasteners including, but not limited to, screws, bolts, hooks, pins, and/or rods.

Similarly to the embodiment of FIG. 9, one of the access panels of the pest control device enclosure 400 is fixed and the other is pivotable; specifically, the first access panel 412 is pivotably affixed to the top panel 404 by a hinged connection 416, allowing for rotation of the first access panel 412 providing for opening and closing of the pest control device enclosure 400. In the present embodiment, the hinged connection 416 is provided by a series of discretely arranged, spaced-apart hinges 417 (FIG. 11). In turn, the second access panel 414 is fixed or non-movably and attached to the top panel 404 and remaining adjacent panels. Thus, access to the interior 402 of the pest control device enclosure 400 for inserting or removing a pest control device (such as the pest control device 320 shown in FIG. 2) is provided by opening the first access panel 412. The pivotable, first access panel 412 of the present embodiment is provided with a lock mechanism 450 comprising a rotatable latch 452 configured to selectively engage with or disengage from a rib 454 (FIG. 11) protruding inwardly from an inner surface of the front panel 408 as shown in FIG. 11, in order to prevent or allow, respectively, the pivoting of the first access panel 412 relative to the top panel 404. In some embodiments, the lock mechanism 450 can be operable from outside the pest control device enclosure 400 by a key, such that inserting and rotating the key within the lock mechanism 450 causes the rotation of the latch 452.

The pest control device enclosure 400 can include at least one top protrusion 460 protruding upwardly from the top panel 404 and configured to block horizontal movement of a pot or other element placed on the top panel 404. For instance, in the present embodiment, the pest control device enclosure 400 is provided with four top protrusions 460 which are angularly spaced apart 90 degrees from one another relative to a geometric center of the four top protrusions 460, so that a pot or other element placed in the space delimited by the four protrusions 460 and having a size substantially matching that of said space is prevented from moving in any horizontal direction along the top panel 404. In some embodiments, the at least one top protrusion 460 can be permanently formed on the top panel 404, such as by injection molding, or permanently attached to the top panel 404 such as by an adhesive or welding. Alternatively, the at least one top protrusion 460 can be removably attached to the top panel 404 to allow a user to remove the at least one top protrusion 460 when not needed, such as if a larger pot or element must be placed on the top panel 404. For instance, the at least one top protrusion 460 can be clipped to the top panel 404, such as by an elastic clipping of one or more arms 462 into corresponding one or more openings 464 in the top panel 404. For further versatility, as shown, the various top protrusions 460 can be individually attached to or removed from the top panel 404, allowing a user to choose the number and arrangement of top protrusions 406 connected to the top panel 404 in dependence of the exact shape of the pot or other element to be retained by the top protrusion(s) 460.

In some embodiments, such as presently shown, any of the wide variety of commercially available, pest control devices 320 as are known in the art may be used. The interior 102 or 202 of the pest control device enclosure 100 or 200 can be amply configured to provide placement of any commercially available pest control devices within pest control device enclosure 100 and pest control device enclosure 200.

Since many modifications, variations, and changes in detail can be made to the described preferred embodiments of the invention, it is intended that all matters in the foregoing description and shown in the accompanying drawings be interpreted as illustrative and not in a limiting sense. Furthermore, it is understood that any of the features presented in the embodiments may be integrated into any of the other embodiments unless explicitly stated otherwise. The scope of the invention should be determined by the appended claims and their legal equivalents.

What is claimed is:

1. An integrated pest control system, comprising:
   a pest control device enclosure, the pest control device enclosure comprising:
   a first side panel and a second side panel located at a left and a right side of the pest control device enclosure, respectively, wherein at least one of the first side panel and the second side panel is hingeably attached via a plurality of arranged, spaced-apart hinges to a top panel and pivotable about the top panel, the first side panel and the second side panel configured to provide controlled access to an interior of the pest control device enclosure,
   a bottom panel including a plurality of snap fittings disposed about at least two peripheral edges of the bottom panel,
   a front panel and a back panel located on a front side and a back side, respectively, of the pest control device enclosure, the front panel and the back panel removably attached to the bottom panel, where the front panel and the back panel are attached to the bottom panel, an outer surface of the back panel and an outer surface the front panel are flush with the peripheral edge of the bottom panel,
   a first through opening and a second through opening located on the first and second side panels of the pest control device enclosure, respectively, wherein the first and second through openings are configured to provide a pest access to the interior of the pest control device enclosure from outside the pest control device enclosure, and further wherein the first and second through openings are closer to the back panel than to the front panel, and
   a planter secured to the top panel of the pest control device enclosure via top protrusions protruding upwardly from the top panel.

2. An integrated pest control system, comprising:
   a pest control device enclosure, the pest control device enclosure comprising:
   a first side panel and a second side panel located at a left and a right side of the pest control device enclosure, respectively, wherein at least one of the first side panel and the second side panel is hingeably attached via a plurality of arranged, spaced-apart hinges to a top panel and pivotable about the top panel, the first side panel and the second side panel and configured to provide controlled access to an interior of the pest control device enclosure,
   a bottom panel including a plurality of snap fittings disposed about at least three peripheral edges of the bottom panel,
   a front panel and a back panel located on a front side and a back side, respectively, of the pest control device enclosure, the front panel and the back panel removably attached to the snap fittings of the bottom panel, when the front panel and the back panel are attached to the bottom panel, an outer surface of the back panel and an outer surface the front panel are flush with the peripheral edge of the bottom panel,
   a first through opening and a second through opening located on the first and second side panels of the pest control device enclosure, respectively, wherein the first and second through openings are configured to provide a pest access to the interior of the pest control device enclosure from outside the pest control device enclosure, and further wherein the first and second through openings are closer to the back panel than to the front panel, and further wherein the first and second through openings are aligned with one another along a left-to-right, transverse direction of the pest control device enclosure, and
   a decorative planter secured to the top panel of the pest control device enclosure via top protrusions protruding upwardly from the top panel,
   wherein the decorative planter partially conceals the pest control device enclosure from plain sight.

* * * * *